United States Patent [19]

O'Brill

[11] E Re. 29,377

[45] Reissued Aug. 30, 1977

[54] FRANGIBLE CONCRETE-JOINT SEALANT PACKAGE

[76] Inventor: Robert O'Brill, 8116 Lorel, Skokie, Ill. 60076

[21] Appl. No.: 544,260

[22] Filed: Jan. 27, 1975

Related U.S. Patent Documents

Reissue of:

[64] Patent No.: 3,813,180
Issued: May 28, 1974
Appl. No.: 307,037
Filed: Nov. 16, 1972

[51] Int. Cl.[2] ..... B65D 83/00

[52] U.S. Cl. ..... 404/48; 52/396; 404/65; 404/66; 206/634; 206/527

[58] Field of Search ..... 52/98–99, 52/173, 396; 206/219, 498, 527; 249/10; 404/48, 64, 69

[56] References Cited

U.S. PATENT DOCUMENTS

| | | | |
|---|---|---|---|
| 1,062,077 | 5/1913 | Burk | 52/98 |
| 1,809,393 | 6/1931 | Rockwell | 52/99 |
| 1,881,438 | 10/1932 | Fischer | 52/396 X |
| 2,666,354 | 1/1954 | Dim et al. | 206/568 X |
| 3,003,289 | 10/1961 | Leibrook et al. | 206/324 X |
| 3,172,237 | 3/1965 | Bradley | 52/396 X |
| 3,411,260 | 11/1968 | Dill | 52/396 X |
| 3,413,900 | 12/1968 | Crone | 404/48 |
| 3,629,986 | 12/1971 | Klittich | 52/396 |
| 3,827,204 | 8/1974 | Walters | 52/396 |
| 3,838,930 | 10/1974 | Koch | 404/48 |

*Primary Examiner*—Steven E. Lipman
*Attorney, Agent, or Firm*—Bernard L. Kleinke

[57] ABSTRACT

A frangible package containing sealant for sealing joints between adjacent construction panels or slabs composed of such materials as concrete, masonry units and curtain wall, includes an elongated tube-like bar having a pair of continuous lines of weakness extending longitudinally along its entire length on opposite sides thereof to enable the bar to be broken apart longitudinally along the lines and thus to release the joint sealant disposed within the hollow interior of the bar, and a pair of end walls for sealing the sealant within the bar. The bar is adapted to be fastened to and extend along the top edge of an expansion joint filler strip, and a pair of external up-turned flanges extending from opposite sides of the bottom portion of the package anchor it to the adjacent slabs after they are positioned on opposite sides of the package and strip so that the top portion of the package may be pulled away readily from its bottom portion leaving it in place to help support the sealant. A bottom wall of the bar is bowed inwardly throughout its length to cause the sealant to assume a complementary shape so that its advantageous shape facilitates its expansion and contraction. When the top portion of the package is separated from its bottom portion, the sealant flows into sealing engagement with the adjacent side edges of the slabs to seal the joint therebetween. When used to seal concrete joints, the top wall of the bar has an external flat surface to serve as a screed when finishing the adjacent concrete surfaces.

11 Claims, 6 Drawing Figures

FRANGIBLE CONCRETE-JOINT SEALANT PACKAGE

Matter enclosed in heavy brackets [ ] appears in the original patent but forms no part of this reissue specification; matter printed in italics indicates the additions made by reissue.

The present invention relates to a frangible joint sealant package, and it more particularly relates to a frangible package containing a sealant adapted to seal a joint between adjacent construction panels or slabs.

Sealants, such as elastomeric sealants, have been used to seal joints between construction panels or slabs composed of materials, such as concrete, masonry and curtain wall, to make the joint waterproof and to provide protection therefor. For example, to seal joints between concrete slabs, sealant has been applied by caulking guns in the joint between the adjacent concrete slabs over an expansion joint strip disposed therein. Also, for some applications, in order to minimize the stresses developed at the bonding surfaces of the sealant, the sealant has been caused to assume a concave shape at both its outer surface and its under surface. The concavity of the outside surface of the sealant has been obtained by pushing the caulking gun nozzle inwardly while applying the sealant, and the inside surface of the sealant has been made concave by positioning between the sealant and the expansion joint strip a compactible back-up strip, which is composed of polyethylene foam or the like material, and which is semi-round in cross section. However, such sealing techniques have not been entirely satisfactory for some applications in that the applying of the sealant has been unduly time consuming. In this regard, care must be exercised not to smear the sealant on adjacent surfaces of the concrete, and thus the time-consuming and unwanted procedure of masking the adjacent surfaces has been oftentimes required. Therefore, it would be highly desirable to be able to seal joints without using a caulking process of applying the sealant to the joint, and also without the necessity of providing back-up material. Also, it would be highly desirable to have a sealant package, which could be used to insert the sealant in place within the joint without the necessity of the time-consuming procedure of masking of adjacent concrete surfaces, and which has a portion of such a shape that the package itself would cause the sealant to assume an advantageous shape for expansion and contraction purposes.

Therefore, the principal object of the present invention is to provide a new and improved sealant package, which is frangible and which is adapted to fit between adjacent construction panels.

Briefly, the above and further objects are realized in accordance with the present invention by providing a frangible sealant package, which includes an elongated tube-like bar having to hollow interior extending throughout its length and having a pair of continuous lines weakness extending longitudinally along its entire length on opposite sides thereof to enable the bar to be broken apart longitudinally along the lines. The joint sealant is disposed within the hollow interior of the bar, and a pair of end walls are secured to the ends of the bar to seal the sealant within the bar. By packaging the sealant in this manner, the proper amount of sealant is applied for each application, and the sealed package helps the joint remain free of dirt or other particles which would otherwise interfere with proper adhering of the sealant with the adjacent surfaces of the slabs, until the package is opened to release the sealant.

The invention, both as to its organization and method of operation, together with further objects and advantages thereof will best be understood by reference to the following detailed description taken in connection with the accompanying sheet of drawings, wherein.

Figure 1:
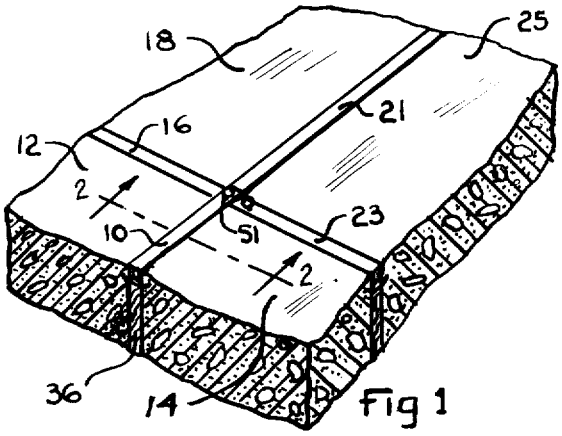
FIG. 1 is a perspective view of a series of frangible concrete-joint sealant packages disposed within joints between adjacent concrete slabs, the packages being constructed in accordance with the present invention.
Figure 2:
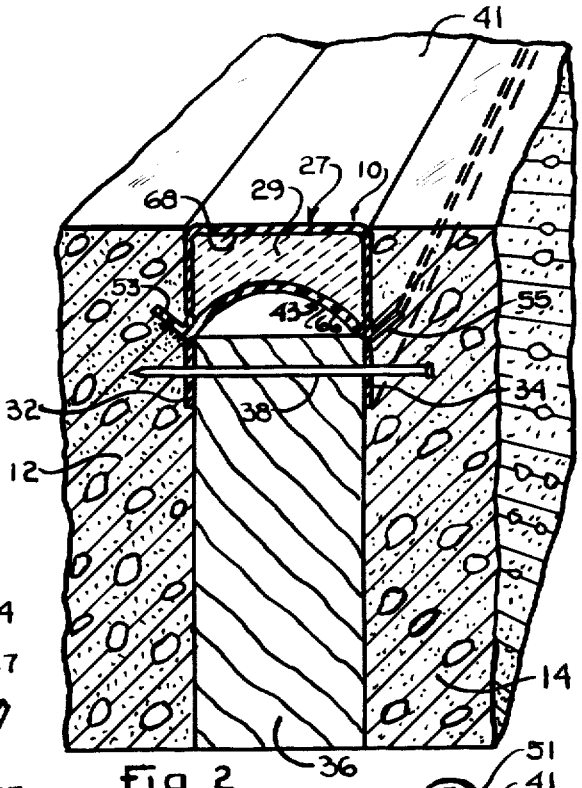
FIG. 2 is an enlarged cross-sectional view of one of the packages of FIG. 1 taken substantially along the line 2—2 thereof.
Figure 3:
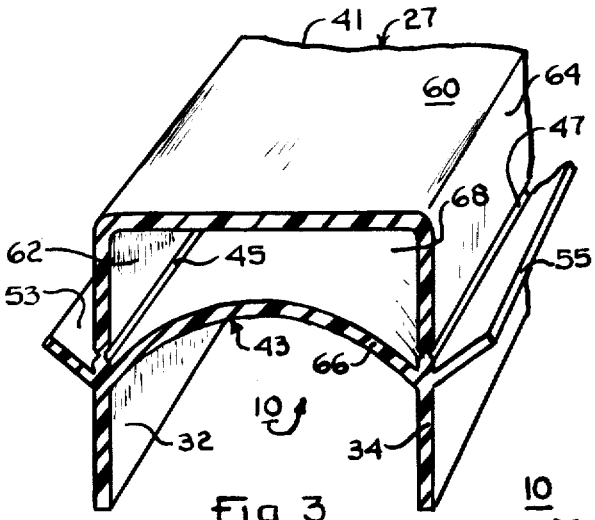
FIG. 3 is an enlarged vertical cross-sectional fragmentary view in perspective of the package of FIG. 2, illustrating it without the sealant contained therein.
Figure 5:
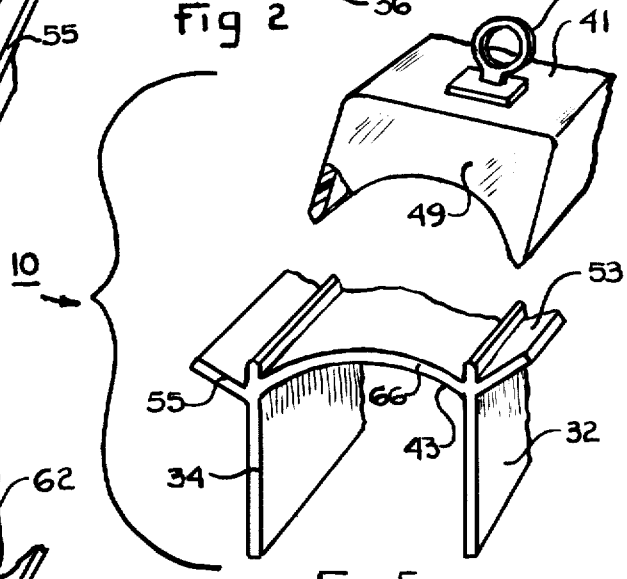
FIG. 5 is a reduced-scale perspective view of the end portion of the package of FIG. 2 showing the package being broken apart.
Figure 4:
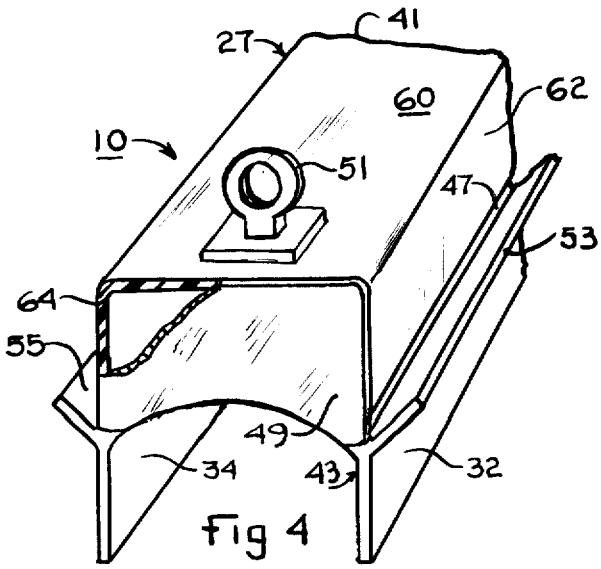
FIG. 4 is a fragmentary, partially broken away perspective end view of the package of FIG. 2.

Referring now to the drawings, and more particularly to FIGS. 1, 2 and 3 thereof, there is shown a frangible sealant package 10 disposed in a joint between adjacent concrete slabs 12 and 14 and constructed in accordance with the present invention to enable concrete-joint sealant to be positioned therein without the need of applying the sealant with a caulking gun. A similar frangible sealant package 16 is disposed in a joint between the concrete slab 12 and a concrete slab 18, and similar packages 21 and 23 are disposed in the respective joints between the slab 18 and a slab 25 and between the slabs 14 and 25. Each one of the sealant packages of FIG. 1 are similar to one another, and therefore only the package 10 will be described in detail. The package 10 generally includes an elongated tube-like bar 27, which has a hollow interior extending throughout its length for confining therein a concrete-joint sealant 29 (FIG. 2), and which includes a pair of parallel, spaced-apart depending flanges 32 and 34 to enable the bar 27 to fit over and be secured to the upper edge of an expansion joint strip 36, the bar 27 being secured thereto by any convenient technique, such as a series of nails, such as the nail 38. The bar 27 includes a channel-shaped cover portion 41 joined to a bottom portion 43 from which extends the depending flanges 32 and 34, the cover portion 41 being joined to the bottom portion 43 at a pair of continuous lines 45 and 47 of weakness extending longitudinally along the entire length of the bar 27 as best seen in FIG. 3. A pair of end walls, such as the end wall 49 shown in FIGS. 4 and 5, seal the sealant 29 within the interior of the bar 27. A finger ring 51 or other suitable gripping device extending externally from the cover portion 41 as shown in the drawings or, if desired, from the end wall 49, enables the finger of the user to grip the cover portion 41 to rip or otherwise pull it away from the bottom portion 43 to enable the sealant 29 to flow to and engage the surfaces of the adjacent concrete slabs 12 and 14 for sealing purposes. In order to insure that the bottom portion 43 is securely anchored during the opening of the package 10, the bar 27 is fastened as previously mentioned to the expansion joint strip 36, and also a pair of angularly disposed up-standing flanges 53 and 55 extend from the bottom portion 43 and extend longitudinally along the entire length of the bar 27 to anchor the bottom portion 43 in the adjacent concrete slabs 12 and 14, respectively.

Considering now the packages 10 in greater detail with reference to FIGS. 2, 3, 4 and 5 of the drawings, the cover portion 41 includes a flat upper wall 60 and a pair of depending side walls or flanges 62 and 64. The exterior flat surface of the top wall 60 serves as a screed when the concrete slabs 12 and 14 are being finished. The bottom edges of the side walls 62 and 64 are joined to the bottom portion 43 at the respective lines 45 and 47. The bottom portion 43 includes a bottom wall 66, which is inwardly bowed or concave in cross section, and which together with the channel-shaped cover portion 41 defines an interior compartment 68 for confining the sealant 29. The bottom portion 43 further includes the depending flanges 32 and 34 which are aligned with the side walls 62 and 64, respectively, of the cover portion 41, the up-turned external flanges 53 and 55 extending from the bottom portion 43 at the upper portion of the respective flanges 32 and 34 immediately below the continuous lines 45 and 47 of the weakened areas. The bottom wall 66 is inwardly bowed to provide a smoothly curved inwardly concave surface to support the sealant in such a manner that it assumes a complementary inwardly bowed or concave shape in cross section at its under side so that the sealant assumes a shape which facilitates contraction and expansion thereof when the adjacent slabs 12 and 14 move toward and away from one another due to ambient temperature changes. For sealing horizontal surfaces, the sealant 29 is preferably a flowable one so that when the cover 41 is removed, it can flow into contact with the adjacent surfaces of the slabs 12 and 14 to provide a tight seal therewith. Also, it should be understood that when the cover 41 is removed, the upper surface of the sealant 29 becomes slightly depressed due to the displacement of the cover 41 as the side walls 62 and 64 of the cover 41 are pulled from between the slabs 12 and 14. Thus, the package 10 facilitates proper shaping of the sealant 29. For sealing horizontal surfaces, the sealant 29 is preferably a one-part self-leveling sealant, either air-cured or moisture-cured, such as the sealant known as Vulkem 45, manufactured by Mameco International of Cleveland, Ohio. For sealing vertically disposed surfaces, a sealant 29 is preferably a one-part non-sag sealant, such as the sealant known as Vulkem 230 also manufactured by Memeco International.

The interior compartment 68 is coated with a suitable sealant-release agent (not shown) such as wax, to permit the cover portion 41 to be separated freely from the bottom portion 43 and the sealant 29 and also to permit the sealant 29 to lift up from the bottom wall during elongation of the sealant cross section when the slabs 12 and 14 move apart in use.

The end covers, such as the cover 49, are heat sealed in place along three of its marginal edges to the edge of the top wall 60 and the end edges of the depending flanges 62 and 64. The edge of the cover opposite the top-wall engaging edge thereof conforms to the bowed shape of the bottom wall 66 and is not fixed thereto. However, it is preferred to apply tape to the cover to secure it to the bottom wall 66 to provide support before the package 10 is used. If the tape is used, it is removed at the time of installation of the package 10.

Figure 6:
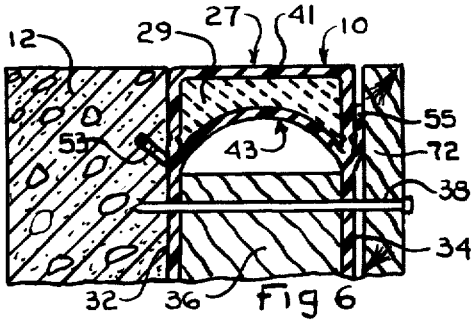
FIG. 6 is a reduced-scale view of the package of FIG. 2 during an assembly operation.

Referring now to FIG. 6, in order to install the package 10 of the present invention, and to seal the joint between the slab 12 and the slab 14, the package 10 is first slipped over the top edge of the expansion joint strip 36, and then the package 10 and the strip 36 are placed in position. Thereafter, a series of stakes, such as the stake 72 are driven into the ground adjacent to the package 10 and the strip 36 until the top edge of the stakes are level with the top wall 60 (FIG. 4) of the package 10, the upstanding flange 55 being bent upwardly and pressed between the stake 72 and the cover 41. Nails, such as the nail 38, are then driven through the stakes, the depending flanges 32 and 34 and the strip 36. The slab of concrete 12 is then poured and finished using the top wall 60 as screed, and after so doing, the stakes are removed, but the nails remain in place since the nails are finishing nails with small heads so that the stakes can be backed therefrom, whereby the nails remain in place to secure the package 10 to the strip 36. The flange 55 then snaps back into its original position, and the slab 14 is then poured. Both of the slabs 12 and 14 are finished using the top wall 60 of the package 10 as a screed. After both slabs 12 and 14 are poured and finished, the ring 51 is grasped, and the cover portion 41 is pulled upwardly to separate the cover portion 41 from the bottom portion 43 along the lines 45 and 47, the cover portion 41 then being discarded. When the cover portion 41 is removed, the sealant 29 flows into contact with the adjacent surfaces of the slabs 12 and 14 within the joint therebetween to form a water-tight, protective seal.

The package 10 is composed of suitable plastic material, such as polystyrene, or other thin wall material, and the cover portion 41 and the bottom portion 43 are formed as a unit by an extrusion process. The lines of weakness are formed during the extrusion process by forming a pair of oppositely-disposed, V-shaped grooves on each one of the side walls 62 and 64; however, it should be understood that only one groove may be provided in each side wall if desired, to form the lines of weakness.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. A frangible sealant [package] *device* for joints between adjacent panels, comprises:

[an] *a one piece* elongated tube-like bar having a hollow interior extending throughout its length, *said bar having a top wall and a pair of parallel spaced-apart depending external flanges extending longitudinally throughout the length of said bar on opposite sides of the top wall to form an upper U-shaped portion and having a bottom wall and a second pair of parallel spaced-apart downwardly depending external flanges extending longitudinally throughout the length of said bar on opposite sides of the bottom wall to form a lower U-shaped portion below said upper portion, said bar* [and] having a pair of continuous lines of weakened areas entending longitudinally along its entire length on opposite sides thereof to enable said bar to be broken apart longitudinally along said lines[;] *to separate said upper and lower portions; said bar being adapted to*

*receive* a concrete-joint sealant [disposed] within said hollow interior of said bar;

[a pair of end walls sealing said sealant within said bar,] and said [bar further including a] *second* pair of parallel spaced-apart downwardly depending external flanges extending longitudinally throughout the length of said bar to *receive* an expansion joint strip therebetween.

2. A frangible sealant [package] *device* according to claim 1, wherein said panels are concrete slabs and said [cover] *top wall* portion has an external flat surface to serve as a screed.

3. A frangible sealant [package] *device* according to claim 1, wherein said bar includes a pair of up-turned external anchoring flanges extending longitudinally throughout the entire length of said bar *from said second pair of parallel flanges.*

[4. A frangible sealant package according to claim 1, wherein said bar includes a channel-shaped cover portion and a bottom wall portion joined to said cover portion at said lines of weakened areas.]

5. A frangible sealant [package] *device* according to claim [4,] *1*, wherein the cross-sectional shape of said bottom wall is configured to be concave inwardly to cause the cross-sectional configuration of the underside portion of said sealant to assume a complementary concave shape.

6. A frangible sealant package according to claim 5, wherein said interior of said bar is coated with a sealant release agent.

7. A frangible sealant [package] *device* according to claim 6, wherein said bar still further includes a pair of up-turned external anchoring flanges extending longitudinally throughout the entire length of said bar.

8. A frangible sealant [package] *device* according to claim 7, wherein said weakened areas are die-cut lines.

9. A frangible sealant [package] *device* according to claim [8,] *2*, wherein said bar is composed of extruded plastic material.

*10. A frangible sealant device for joints between adjacent panels, comprises: an elongated tube-like bar having a hollow interior extending throughout its length and having a pair of continuous lines of weakened areas extending longitudinally along its entire length on opposite sides thereof to enable said bar to be broken apart longitudinally along said lines; said bar being adapted to receive a concrete-joint sealant within said hollow interior of said bar; and said bar having a bottom wall, said bar including a pair of up-turned external anchoring flanges on opposite sides thereof near said bottom wall.*

*11. A frangible sealant device according to claim 1, further including a pair of end walls for sealing said sealant within said bar to form a package.*

*12. A frangible sealant device according to claim 11, wherein said bar includes a bottom wall, the cross-sectional shape of said bottom wall being configured inwardly to cause the cross-sectional configuration of the underside portion of said sealant to assume a complementary concave shape.*

* * * * *